United States Patent [19]

Kay et al.

[11] Patent Number: 6,112,777
[45] Date of Patent: Sep. 5, 2000

[54] PROCESS FOR BULK HANDLING ELASTOMERIC MATERIALS VIA TEMPERATURE CONTROL

[75] Inventors: Thomas Wayne Kay, Middletown; Duanfan Wang, Sommerville; John Francis Kantz, Oxford, all of N.J.; Alvin Otis Bowles, Jr., Houston, Tex.

[73] Assignee: Union Carbide Chemicals & Plastics Technology Corporation, Danbury, Conn.

[21] Appl. No.: 09/195,609

[22] Filed: Nov. 19, 1998

[51] Int. Cl.[7] .................................................. B65B 1/00
[52] U.S. Cl. ................................................................ 141/1
[58] Field of Search ..................................... 141/1

[56] References Cited

U.S. PATENT DOCUMENTS

| | | | |
|---|---|---|---|
| 4,198,860 | 4/1980 | King | 73/195 |
| 4,617,868 | 10/1986 | Wahlstrom et al. | 105/282 |
| 4,666,694 | 5/1987 | Jons et al. | 423/555 |
| 4,703,094 | 10/1987 | Raufast | 526/65 |
| 4,880,148 | 11/1989 | Schmidt | 222/195 |

*Primary Examiner*—J. Casimer Jacyna
*Attorney, Agent, or Firm*—P. W. Leuzzi; R. C. Brown

[57] ABSTRACT

There is provided a process for bulk handling an elastomeric material in granular form comprising loading said elastomeric material into a transport vessel while maintaining the loading temperature of the majority of the elastomeric material below 60 degrees C., preferably below 45 degrees C.

5 Claims, 1 Drawing Sheet

PROCESS FOR BULK HANDLING ELASTOMERIC MATERIALS VIA TEMPERATURE CONTROL

FIELD OF THE INVENTION

The invention relates to a process for transporting and/or storing bulk materials that have a tendency to compact, consolidate, or pack over time. More particularly, the present invention relates to a process for bulk handling elastomeric materials such as sticky polymers that are in granular and/or particulate form.

BACKGROUND OF THE INVENTION

Commercially, elastomeric materials such as sticky polymers, for example, EPRs and polybutadiene are produced in solution, slurry or bulk processes. So produced, these elastomeric materials are formed into bales and shipped on trucks or rail cars. The bales may or may not be loaded into a shipping container or box for transport. The pallets holding the bales are removed from shipping trucks, cars, and/or containers using forklift trucks employing a hydraulic or pneumatic device. Once the bales are unloaded, they have to be chopped or ground so that they can be fed to a manufacturer's formulating and/or molding process. Thus, the bale form of these elastomeric or rubbery materials involves significant labor and costs to the facility where it is unloaded.

In contrast, recently developed processes, such as gas phase polymerization processes, for example, those developed by Union Carbide Corporation, can produce elastomeric materials combined with a fluidization aid (e.g., sticky polymers such as an ethylene-propylene-ENB terpolymer) which results in a flowable particle that is granular in form upon exiting the polymerization reactor. Hence, the handling problems associated with these gas phase produced materials differ significantly from those or similar elastomers in bale form.

These gas phase produced elastomeric materials can be poured and/or fed via gravity into railroad hopper cars or into trucks for transport. Alternatively, smaller quantities can be placed in bags for shipping. However, it has been discovered that these granular elastomeric materials may exhibit handling problems. It has been found that over time during shipping and/or storage these sticky elastomeric materials have a tendency to compact or consolidate. This makes it difficult for the receiver or user of these materials to unload them and/or feed them into their processes.

Accordingly, there is an on-going need to alleviate or minimize such materials handling problems and to provide a simple, cost-effective means of loading and/or unloading these elastomeric materials.

SUMMARY OF INVENTION

Figure 1:
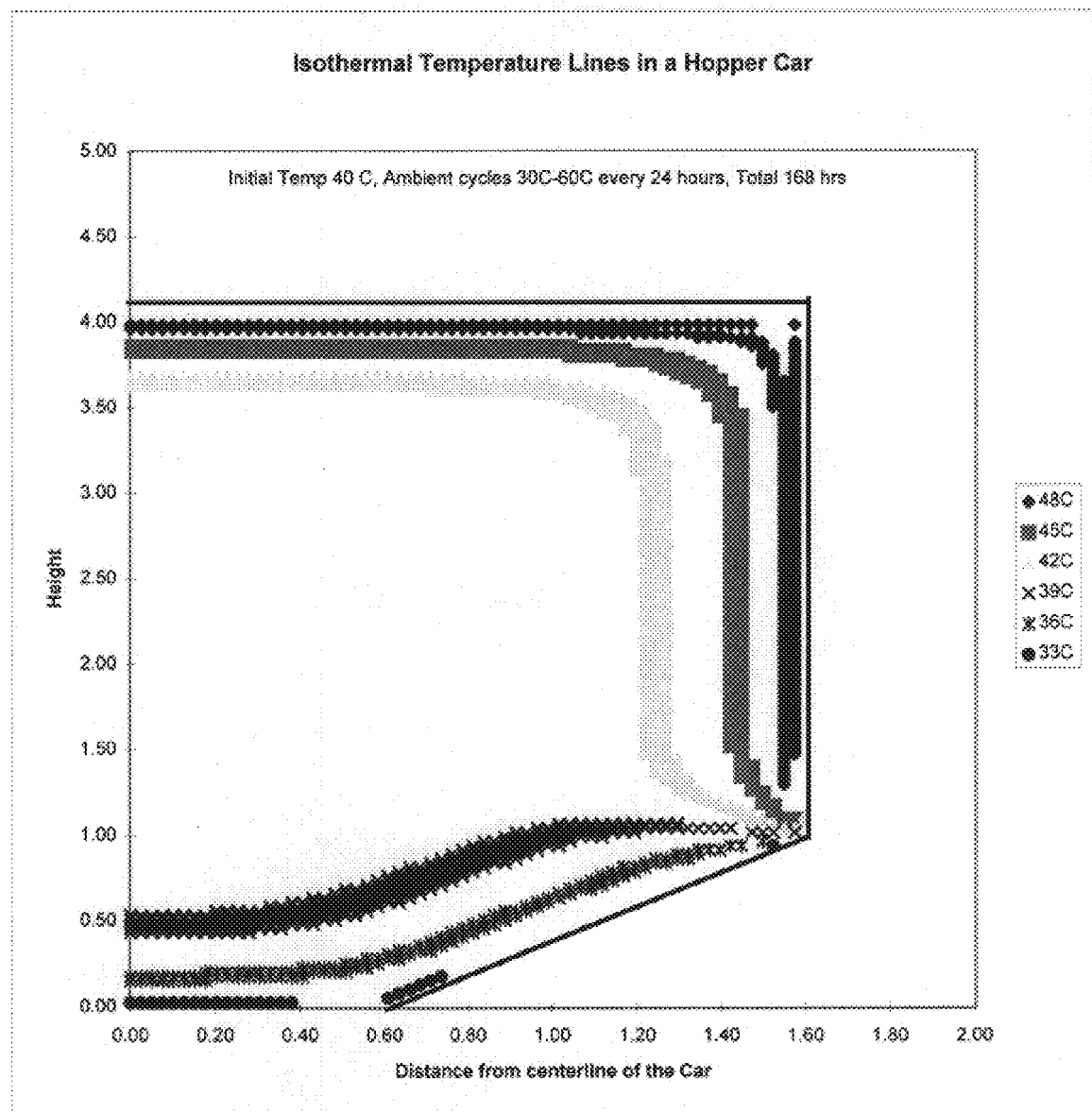
FIG. 1 is an isothermal map of the expected temperatures in a cross section of a hopper car referred to in the experimental section.

It has been discovered that there exists a maximum loading temperature for these elastomeric materials; and, that above that temperature, cohesive strength increases as the result of consolidation over time such that these materials cannot be easily removed from a container using gravity. Advantages of the invention can include reduced cost of transportation, improved handling safety, and/or reduced cost of materials handling at the receiving facility.

Accordingly, there is provided a process for bulk handling an elastomeric material in granular form comprising loading said elastomeric material into a vessel while maintaining the loading temperature of the majority of the elastomeric material below 60 degrees C., preferably below 45 degrees C.

DETAILED DESCRIPTION OF THE INVENTION

Elastomeric or rubbery materials which can benefit from the present invention are, for example, those elastomeric polymers produced in gas phase processes. Gas phase processes such as those employing a gas fluidized reactor or a gas fluidized reactor that is assisted by mechanical stirring can be employed. Such elastomeric polymers are produced by processes disclosed, for example, in U.S. Pat. Nos. 4,994,534; 5,304,588, 5,317,036; 5,453,471; and WO96/04322 and WO96/04323, among others.

The elastomers produced in these processes are granular or powdery with an average diameter size ranging from about 0.001 mm to 5 mm, preferably from about 0.001 mm to 2 mm, and most preferably from about 0.001 to 1 mm. Typically these polymers are polymerized at or above their sticking or softening temperature in the presence of an inert particulate material (silica, carbon black, clay, talc, etc.) in an amount ranging from about 0.3–80 wt %, preferably from about 4–75 wt %, and most preferably from about 4–40 wt % based upon the total weight of the polymer particle produced.

Illustrative of these elastomers that can be employed in the present invention include, but are not limited to, polyisoprene; polybutadiene; a polymer of butadiene copolymerized with styrene; a polymer of butadiene copolymerized with acrylonitrile; a polymer of butadiene copolymerized with isoprene; a polymer of butadiene, isoprene, and styrene; a polymer of butadiene, acrylonitrile, and styrene; a polymer of isobutylene and isoprene; a polymer of ethylene and an alpha olefin having 3 to 12 carbon atoms (e.g., ethylene-propylene and ethylene-butene polymers); a polymer of ethylene, an alpha olefin having 3 to 12 carbon atoms (e.g., propylene) and a non-conjugated diene (such non-conjugated dienes can include, for example, ethylidene norbornene (ENB), hexadiene, dicyclopentadiene, and octadiene (e.g., a methyl octadiene); and mixtures thereof.

The invention is especially useful for elastomeric materials comprising a mixture of at least one inert particulate material and a polymer comprising ethylene, propylene, and optionally a diene such as ENB. Typically, these materials have an ethylene content ranging from 50 to 90 wt %; a propylene content ranging from 10 to 45 wt %; and a diene content ranging from 0 to 15 wt % based upon the total weight of the polymer and inert particulate material comprising the elastomer. The higher the amount of propylene, diene or both, the more amorphous the elastomer; and, hence, the more consolidation that takes place during shipping and storage. The more amorphous the elastomeric material (or the lower the Mooney), the more consolidation strength that develops, and accordingly, the more the loading temperature needs to be lowered in order for the material to be flowable when it is unloaded at the receiver or after storage or both.

Typically, these elastomeric materials are polymerized in a gas phase process and purged in a post reaction process at higher temperatures than the critical maximum temperature for loading the materials into containers for shipping. The critical maximum loading temperature is defined as that temperature at or below which the elastomeric material flows upon being unloaded. Another way of describing the critical maximum loading temperature is that it is the temperature above which the cohesive forces of the elastomeric material become so excessive that the material loses its flowability by the time it reaches its destination and is unloaded. So, in the present invention, elastomeric materials that have been purged are cooled to at or below the critical maximum temperature, loaded into the bulk shipping container by means such as pressure, vacuum, gravity loading or a combination of them. Then the material is ultimately unloaded usually by gravity with or without assistance of mechanical means such as vibration or fluidization, or blasting with inert gasses, following shipment or storage.

It is not necessary for all of the elastomeric material to be maintained at or below the critical maximum temperature. It is sufficient if a majority (at least about 70%) of it is at or below this temperature. Generally, after the elastomeric material has been loaded into the container it forms a slightly hardened "skin" on the surfaces closest to the container walls and/or top of the bed of material, thereby encasing or sealing in the majority of the material. This skin can be easily ruptured at destination and can serve to protect the elastomeric material during shipping. This skin may also result from material exposure to high temperature ambient conditions at the material surface. The bulk of the material remains at or near its loading temperature.

The maximum critical loading temperature for these gas phase produced elastomers is generally at or below 60 degrees C. EPR elastomeric materials are produced in different formulations or grades. The three most common grades are #6322, #7265, and #8315. The maximum critical loading temperature for #6322 is at or below about 40 degrees C. Grade #7265 utilizes a maximum critical loading temperature that is at or below about 45 degrees C. And #8315 has a maximum critical loading temperature that is at or below about 42 degrees C. All these grades of gas phase produced materials be rendered flowable upon unloading by cooling to at or below 45 degrees C., typically having a loading temperature ranging from about 25 to 45 degrees C., most preferably from about 30 to 40 degrees C. as measured prior to or during loading. The elastomeric materials are allowed to cool to at or below the maximum critical loading temperature in air or in an inert atmosphere in the presence or absence of one or more stabilizers (antioxidants, antiozoants, odor-removing compounds or substances, gel inhibitors, etc.) which can be combined with the elastomeric material at any time prior to shipping.

The other non-EPR elastomeric materials enumerated herein can be loaded similarly and their maximum critical loading temperatures can be determined empirically as set forth in the examples. In any event, their maximum critical loading temperatures are typically the same or lower than those for EPR.

In practice, these elastomeric materials are preferably cooled by the use of fluidized cooling vessels using ambient or refrigerated air or other gas. However, other cooling means can include, for example, the use of a cooling vessel equipped with cooling jackets and/or internal cooling coils, and utilizing cooled water for heat transfer.

All references cited herein are incorporated by reference. The following examples are given to illustrate the invention and are not necessarily intended as limitations thereof. All parts and percentages in the specification including the examples are by weight unless otherwise specified.

Examples

Experiments were performed to define the conditions required to allow gravity flow from a bulk transportation or storage container.

I. A first series of experiments were conducted determine the solids flow properties of the elastomeric material.

Solids flow properties were determined for several elastomeric polymers at various temperatures using a vertical shear cell. The instrument used was the Johanson Hang Up Indicizer, supplied by J. R. Johanson Inc. Test temperatures varied between 25° C. and 45° C. The consolidation time was held constant at 24 hrs. for each sample.

The data clearly established a relationship between flowability and temperature. Although specific relationships varied slightly depending upon polymer and/or its composition, each behaved with degraded flow properties with increasing temperatures.

II. A second series of experiment were conducted and showed that the temperature of the elastomeric material was the more influential parameter on the flowability of the polymer.

This series of experiments were conducted using a model bin consisting of a rectangular cylinder equipped with a 45° planes conveying hopper. The hopper opening measured 1 ft.×5 ft. The model was loaded with EPR and subjected to a consolidation load equivalent to 13 ft. of material height. The entire assembly was then placed in a controlled heating room to bring the material up to the required test temperature. After conditioning, the test was concluded by opening the bottom of the test model and observing for gravity flow/unloading of the test vessel.

Experiments were conducted at three temperatures using the same polymer formulation. At 38° C. the polymer flowed easily by gravity, while it would not flow at 48° C. The third experiment established that at an intermediate temperature, 41° C. flow was sluggish but successful.

III. A third series of experiments were conducted to determine the effect of ambient temperatures on the container had on the polymer inside that container.

This study was employed to determine if the polymer temperature at destination or unloading could be controlled by regulating the initial loading temperature. The study involved a computer simulation designed to predict the temperature of the bulk of the polymer loaded into a sealed hopper car at a given temperature and then exposed to varying ambient temperature cycles. The computer model used was based on the thermal properties of the polymer itself, the principles of heat transfer and experience of normal ambient temperatures. The model produced an isothermal map of the expected temperatures in a cross section of a hopper car. The isothermal map is depicted in FIG. 1

The model predicted that although a relatively thin skin of polymer may absorb enough heat from ambient heat transfer to form a consolidated skin of material, the bulk of the polymer remained close to the temperature of initial loading. These simulated results closely parallel the results from the hopper car simulation test described above.

These data point out that, if the loading temperature is controlled, the ambient temperature to which the container or vessel is exposed during transit or storage will have little or no effect on the flowability of the material or the ability to unload it at destination or when needed for further processing.

IV. Finally, a full-scale test using a hopper car was performed.

This test further confirmed the correlation between loading of the elastomeric material (EPR) and the ability to unload the bulk container later. Approximately 35,000 lbs. of EPR was heated and loaded into a single compartment of a hopper car. The loaded temperature of the material was between 45 and 50° C. These temperatures were attained by heating the polymer with hot fluidization air and conveying it into the compartment. The car was a standard hopper car with a 48"×13" rectangular gate at the bottom of the compartment.

Following loading, the car was shipped from Texas to New Jersey where the unloading experiment took place. Attempts to gravity unload the car met with failure. The addition of hopper car vibrations failed to initiate flow. After several attempts the car was manually unloaded from the top hatch.

The second phase of the experiment involved reloading the car with the same polymer, only at approximately 25° C. Following five days of storage, during which the car was moved to simulate shipment over about the same distance as described above, the unloading test was repeated. In this case, the material flowed by gravity, without the aid of vibration.

The results further confirmed the hypothesis that temperature plays a dominant role in the flow properties of these materials.

The best mode for the process is to load the granular elastomeric material (e.g., EPR) at a temperature as close to the maximum critical loading temperature for flow, since this optimizes the cooling required at upon loading while still meeting the temperature requirements necessary for flowability at destination or use upon storage. However, the material may be loaded at temperatures below the maximum critical loading temperature if desired.

What is claimed is:

1. A method for facilitating the bulk handling of elastomeric particulate material produced in a gas fluidized bed reactor, which comprises:
   a) removing said particulate material from said reactor,
   b) cooling said particulate material to a temperature at or below the temperature at which significant agglomeration of said material will occur in the presence of one or more stablizers and
   c) transferring the resultant cooled particulate material to a storage or transport vessel.

2. A method according to claim 1 wherein said particulate material is cooled to a temperature below about 45° C.

3. A method according to claim 1 wherein said particulate material is cooled to a temperature between about 30° C. to about 40° C.

4. A method according to claim 1 wherein at least about 70% of said particulate material is cooled to a temperature at or below which said elastomeric particulate material retains the ability to flow.

5. A method according to claim 1 wherein said particulate material is cooled in a gas fluidized vessel.

* * * * *